United States Patent
Ishimura et al.

(10) Patent No.: US 11,897,559 B2
(45) Date of Patent: Feb. 13, 2024

(54) STEERING CONTROL DEVICE AND POWER STEERING DEVICE

(71) Applicant: Nidec Corporation, Kyoto (JP)

(72) Inventors: Hiroyuki Ishimura, Kawasaki (JP); Shuji Endo, Kyoto (JP); Hanyu Sun, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 349 days.

(21) Appl. No.: 16/585,086

(22) Filed: Sep. 27, 2019

(65) Prior Publication Data
US 2020/0102005 A1    Apr. 2, 2020

(30) Foreign Application Priority Data

Sep. 28, 2018    (JP) .................. 2018-185536

(51) Int. Cl.
*B62D 6/00*    (2006.01)
*B62D 1/11*    (2006.01)
*B62D 5/04*    (2006.01)

(52) U.S. Cl.
CPC ............... *B62D 6/008* (2013.01); *B62D 1/11* (2013.01); *B62D 5/0463* (2013.01)

(58) Field of Classification Search
None
See application file for complete search history.

(56) References Cited

U.S. PATENT DOCUMENTS

| | | | | |
|---|---|---|---|---|
| 5,668,721 A * | 9/1997 | Chandy | ............... | B62D 5/0466 180/412 |
| 5,668,722 A * | 9/1997 | Kaufmann | ........... | B62D 5/0466 180/446 |
| 5,704,446 A * | 1/1998 | Chandy | ............... | B62D 5/0466 180/446 |
| 5,719,766 A * | 2/1998 | Bolourchi | ............ | B62D 5/0466 701/42 |
| 6,450,287 B1 * | 9/2002 | Kurishige | ............ | B62D 5/0466 180/443 |
| 6,625,530 B1 * | 9/2003 | Bolourchi | .............. | B62D 6/008 180/402 |
| 6,789,641 B2 * | 9/2004 | McLaughlin | ........ | B62D 5/0463 180/446 |

(Continued)

FOREIGN PATENT DOCUMENTS

DE    10 2005 003 180 A1    7/2006
DE    11 2010 004 195 B4    3/2018

(Continued)

*Primary Examiner* — Isaac G Smith
*Assistant Examiner* — Jennifer M Anda
(74) *Attorney, Agent, or Firm* — Keating & Bennett, LLP

(57) ABSTRACT

A steering control device for controlling drive of a motor that drives a steering mechanism according to an operation amount of a steering wheel, includes a first torque command controller that instructs the motor on motor torque according to the operation amount of the steering wheel, and a second torque command controller that instructs the motor on the motor torque according to the operation amount of the steering wheel in parallel with the first torque command controller. The second torque command controller suppresses a frequency region corresponding to disturbance added to the steering mechanism with respect to the operation amount of the steering wheel with a filter.

5 Claims, 5 Drawing Sheets

(56) References Cited

U.S. PATENT DOCUMENTS

| | | | | |
|---|---|---|---|---|
| 6,863,150 B1* | 3/2005 | Tanaka | B62D 5/0463 | |
| | | | 180/443 | |
| 7,188,701 B2* | 3/2007 | Patankar | B62D 5/0463 | |
| | | | 180/446 | |
| 7,219,761 B2* | 5/2007 | Fukuda | B62D 5/0427 | |
| | | | 180/443 | |
| 8,498,783 B2* | 7/2013 | Williams | B62D 6/008 | |
| | | | 701/42 | |
| 8,818,633 B2* | 8/2014 | Ebihara | B62D 5/0472 | |
| | | | 701/41 | |
| 8,820,469 B2* | 9/2014 | Sakaguchi | B62D 5/0472 | |
| | | | 180/402 | |
| 10,144,448 B2 | 12/2018 | Minaki et al. | | |
| 2006/0180369 A1 | 8/2006 | Brosig et al. | | |
| 2009/0192679 A1* | 7/2009 | Kobayashi | B62D 5/0466 | |
| | | | 701/42 | |
| 2010/0286870 A1* | 11/2010 | Endo | B62D 5/046 | |
| | | | 701/41 | |
| 2011/0153162 A1* | 6/2011 | Kezobo | B62D 5/0472 | |
| | | | 701/42 | |
| 2012/0185132 A1 | 7/2012 | Kezobo et al. | | |
| 2013/0073146 A1 | 3/2013 | Konomi et al. | | |
| 2013/0261894 A1* | 10/2013 | Kojima | B62D 5/0484 | |
| | | | 701/41 | |
| 2015/0025745 A1* | 1/2015 | Tamura | B62D 6/00 | |
| | | | 701/41 | |
| 2015/0191200 A1* | 7/2015 | Tsubaki | B62D 6/002 | |
| | | | 701/42 | |
| 2016/0001810 A1* | 1/2016 | Tsubaki | B62D 6/08 | |
| | | | 701/42 | |
| 2016/0016606 A1* | 1/2016 | Tsubaki | B62D 5/0472 | |
| | | | 701/41 | |
| 2016/0129933 A1* | 5/2016 | Akatsuka | B62D 15/025 | |
| | | | 180/446 | |
| 2016/0251028 A1* | 9/2016 | Tsubaki | B62D 5/046 | |
| | | | 701/42 | |
| 2017/0015351 A1* | 1/2017 | Endo | B62D 5/0466 | |
| 2017/0029019 A1* | 2/2017 | Hales | B62D 5/0463 | |
| 2017/0217479 A1* | 8/2017 | Tsubaki | B62D 5/0412 | |
| 2018/0178828 A1* | 6/2018 | Tsubaki | B62D 5/0472 | |
| 2018/0290682 A1* | 10/2018 | Nampei | B62D 5/0406 | |
| 2019/0002022 A1* | 1/2019 | Kim | B62D 6/02 | |
| 2021/0206424 A1* | 7/2021 | Nakakuki | H02P 4/00 | |

FOREIGN PATENT DOCUMENTS

| | | |
|---|---|---|
| EP | 2 269 892 A1 | 1/2011 |
| EP | 3 106 367 A1 | 12/2016 |
| JP | 2010-163109 A | 7/2010 |
| JP | 2011-245918 A | 12/2011 |

* cited by examiner

STEERING CONTROL DEVICE AND POWER STEERING DEVICE

CROSS REFERENCE TO RELATED APPLICATION

The present invention claims priority under 35 U.S.C. § 119 to Japanese Application No. 2018-185536 filed on Sep. 28, 2018, the entire contents of which are hereby incorporated herein by reference.

1. FIELD OF THE INVENTION

The present invention relates to a steering control device and a power steering device.

2. BACKGROUND

As steering control (assist control) of an electric power steering device, a conventional technology for reducing influence of disturbance from a road surface has been known.

For example, a structure in which a disturbance observer is used to estimate the disturbance applied to a steering system.

Unfortunately, when a dynamic characteristic of the steering system is estimated by a mathematical model, accuracy of the mathematical model affects accuracy of the disturbance estimation. Thus, in a disturbance estimation using the mathematical model, disturbance compensation becomes complicated.

SUMMARY

An aspect of a steering control device according to an example embodiment of the present disclosure, in the steering control device for controlling drive of a motor that drives a steering mechanism according to an operation amount of a steering wheel, includes a first torque command controller that instructs the motor on motor torque according to the operation amount of the steering wheel, and a second torque command controller that instructs the motor on the motor torque according to the operation amount of the steering wheel in parallel with the first torque command controller. The second torque command controller suppresses a frequency region corresponding to disturbance added to the steering mechanism with respect to the operation amount of the steering wheel with a filter.

An aspect of a power steering device according to an example embodiment of the present disclosure includes the steering control device, a motor controlled by the steering control device, and a steering mechanism driven by the motor.

The above and other elements, features, steps, characteristics and advantages of the present disclosure will become more apparent from the following detailed description of the example embodiments with reference to the attached drawings.

DETAILED DESCRIPTION

Example embodiments of steering control devices and power steering devices of the present disclosure will be described in detail with reference to the attached drawings hereinafter. In order to avoid an unnecessarily redundant following description and facilitate understanding of the person skilled in the art, an unnecessarily detailed description may be omitted. For example, a detailed description of already well-known matters and a redundant description of substantially the same configuration may be omitted.

Figure 1:
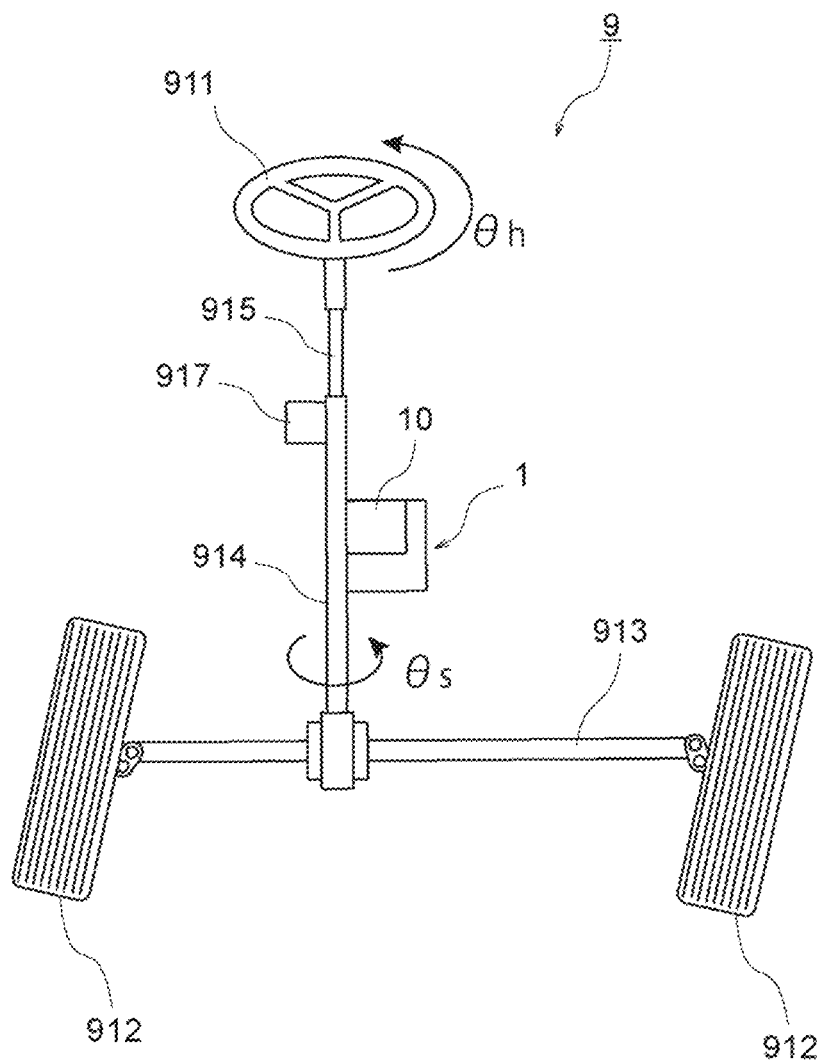
FIG. 1 is a schematic view illustrating an example embodiment of a power steering device according to the present disclosure.

FIG. 1 is a schematic view illustrating an example embodiment of a power steering device of the present disclosure.

As shown in FIG. 1, in the present example embodiment, a column-type electric power steering device is exemplified. An electric power steering device 9 is mounted on a steering mechanism of wheels of a car. The electric power steering device 9 is the column-type power steering device that directly reduces steering force by power of a steering control device 1 into which a motor 10 is built. The electric power steering device 9 includes the steering control device 1, a steering shaft 914, and an axle 913.

The steering shaft 914 transmits input torque transmitted from a steering wheel 911 via a torsion bar 915 to the axle 913 having wheels 912. When the steering wheel 911 is operated, a steerage angle $\theta h$ is generated, and the torsion bar 915 is twisted to generate steering torque. The steering torque is transmitted from the torsion bar 915 to a steering mechanism including the wheels 912, the axle 913, and the steering shaft 914. That is, the steering wheel 911 applies the steering torque to the steering mechanism via the torsion bar.

The power of the steering control device 1 is transmitted to the steering shaft 914 via gears or the like. The motor 10 used in the column-type electric power steering device 9 is provided inside an engine room (not shown). Although the electric power steering device 9 shown in FIG. 1 is of the column-type as an example, the power steering device of the present disclosure may be of a rack-type. The steering control device 1 controls a rotation angle of the motor 10 for driving the steering mechanism according to an operation amount of the steering wheel 911.

The torque transmitted from the torsion bar 915 to the steering shaft 914 is detected by a torque sensor 917. A value detected by the torque sensor 917 is input into the steering control device 1 and used to calculate a target output of the steering control device 1.

A rotation shaft (output shaft) of the motor 10 and the steering shaft 914 are mutually connected via a reduction gear and the like. Thus, the motor 10 and the steering shaft 914 always rotate together regardless of whether the torque for rotating the steering shaft 914 is torque by the motor 10 or another torque. Therefore, a steering angle $\theta s$ is calculated from the number of rotations of the motor 10 based on a gear ratio and the like. The steering angle $\theta s$ calculated in this manner is also used to calculate the target output in the steering control device 1.

The steering torque transmitted from the steering wheel 911 via the torsion bar 915 and assist torque by the power of the steering control device 1 are applied to the steering shaft 914 while self alignment torque and the like are transmitted from the wheels 912 to the steering shaft 914 via the axle 913 to generate the steering angle θs that is a rotation angle of the steering shaft 914.

Figure 2:
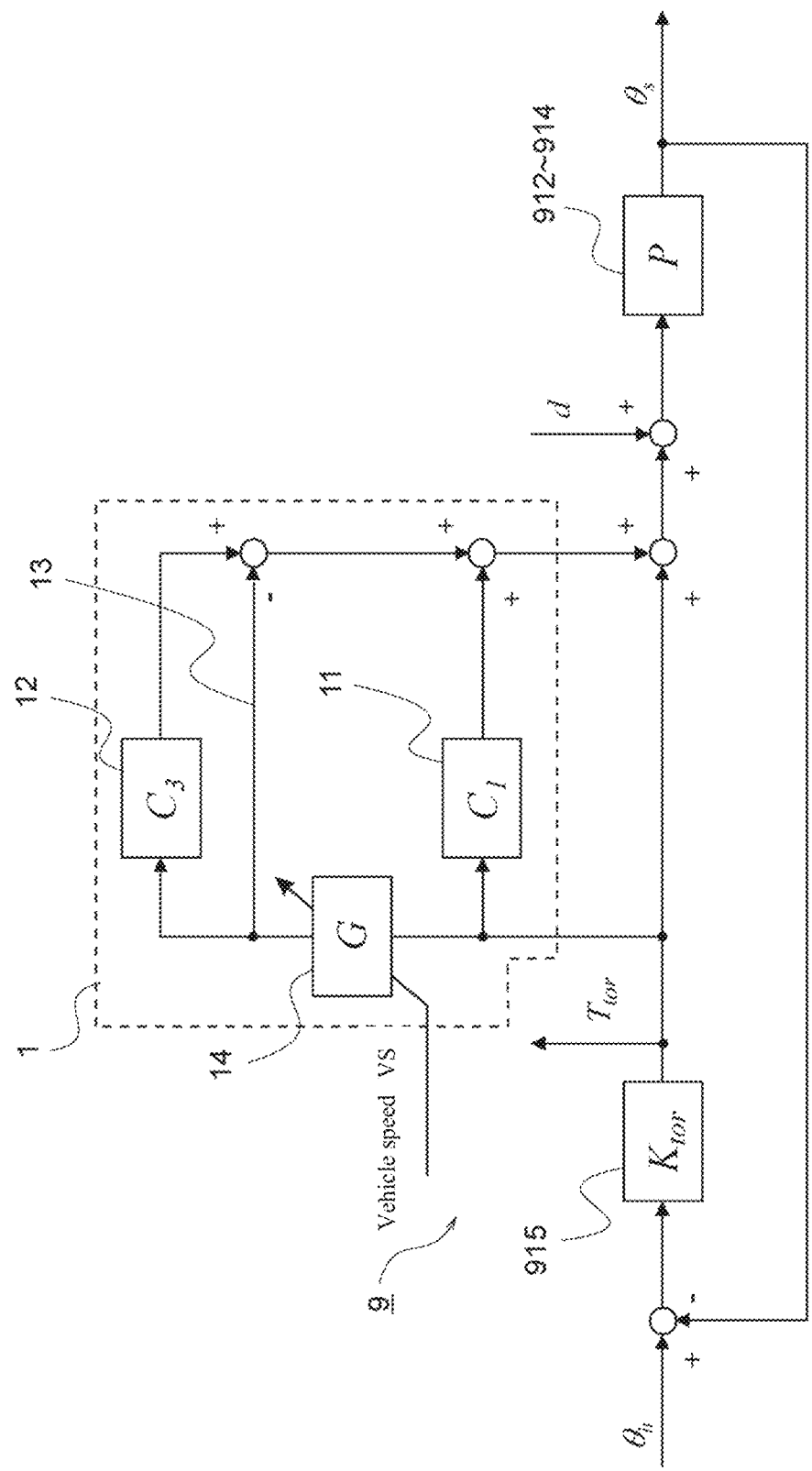
FIG. 2 is a block diagram illustrating a configuration of an electric power steering device.

FIG. 2 is a block diagram illustrating a configuration of the electric power steering device 9.

In FIG. 2, θh represents the steerage angle, θs represents the steering angle, $K_{tor}$ represents a torsion coefficient of the torsion bar 915, and P represents a plant element of the steering mechanism.

A difference between the steerage angle θh of the steering wheel 911 and the steering angle θs twists the torsion bar 915 to generate the torque. The steering torque $T_{tor}$ generated in the torsion bar 915 is detected by the torque sensor 917 and input into the steering control device 1.

The steering control device 1 includes a first control unit 11, a second control unit 12, a torque cancellation unit 13, and a vehicle speed fade unit 14. Among these elements, the first control unit 11, the second control unit 12, and the torque cancellation unit 13 represent a function combining calculation of a control signal input into the motor 10 and the output of the motor 10 according to the control signal.

The first control unit 11 and the second control unit 12 instruct the motor 10 on motor torque according to the operation amount of the steering wheel 911. The second control unit 12 instructs the motor 10 on the motor torque in parallel with the first control unit 11.

The first control unit 11 performs feedback control based on a value of the steering torque $T_{tor}$ detected by the torque sensor 917. That is, the steering torque $T_{tor}$ is reduced by causing the motor 10 to generate the assist torque based on the detected torque value. As a result, operating force for operating the steering wheel 911 is reduced.

As the feedback control for generating the assist torque, feedback control for reducing the difference between the steerage angle θh and the steering angle θs (steering angle control) may be used as well as the feedback control for reducing the torque (torque control) as described above. When this steering angle control is used, an angle sensor for detecting the steerage angle θh of the steering wheel 911 is provided, and a value detected by the angle sensor is input into the first control unit 11. The first control unit 11 controls the torque of the motor 10 with the rotation angle (steerage angle θh) of the steering wheel as a command value.

The second control unit 12 causes the motor 10 to generate a torque component that suppresses influence of disturbance d. As will be described in detail later, the second control unit 12 suppresses a frequency region corresponding to the disturbance d added to the steering mechanism with respect to the operation amount of the steering wheel 911 with a filter. According to the steering control device 1 including the second control unit 12, the disturbance is suppressed by the filter having a simple configuration that does not use a mathematical model. As a result, in the electric power steering device 9, a smooth power assist is realized.

The torque cancellation unit 13 instructs the motor 10 on motor torque to cancel the steering torque $T_{tor}$ in parallel with the first control unit 11 and the second control unit 12. Since the steering torque $T_{tor}$ is cancelled by the torque cancellation unit 13, a function of disturbance suppression by the second control unit 12 becomes sharpening.

The vehicle speed fade unit 14 calculates gain according to a vehicle speed VS, and multiplies the steering torque $T_{tor}$ input into the second control unit 12 and the torque cancellation unit 13 by the gain. The gain calculated by the vehicle speed fade unit 14 decreases as the vehicle speed VS decreases, and as the vehicle speed VS approaches zero, the gain also approaches zero. Thus, the motor torque instructed to the motor by the second control unit 12 and the torque cancellation unit 13 decreases with decrease of the vehicle speed, and fades out as the vehicle speed VS approaches zero. As a result, the function of the disturbance suppression is reduced at a time of low speed or when the vehicle is stopped. In the example shown in FIG. 2, although the vehicle speed fade unit 14 adaptively controls input values into the second control unit 12 and the torque cancellation unit 13 with respect to the vehicle speed VS, the vehicle speed fade unit 14 may reduce the input values, for example, using map data. Further, in the example shown in FIG. 2, although the vehicle speed fade unit 14 decreases the input values into the second control unit 12 and the torque cancellation unit 13, the vehicle speed fade unit 14 may reduce an instruction value to the motor 10 with adaptive control and the map data.

The second control unit 12 will be described in detail hereinbelow.

Figure 3:
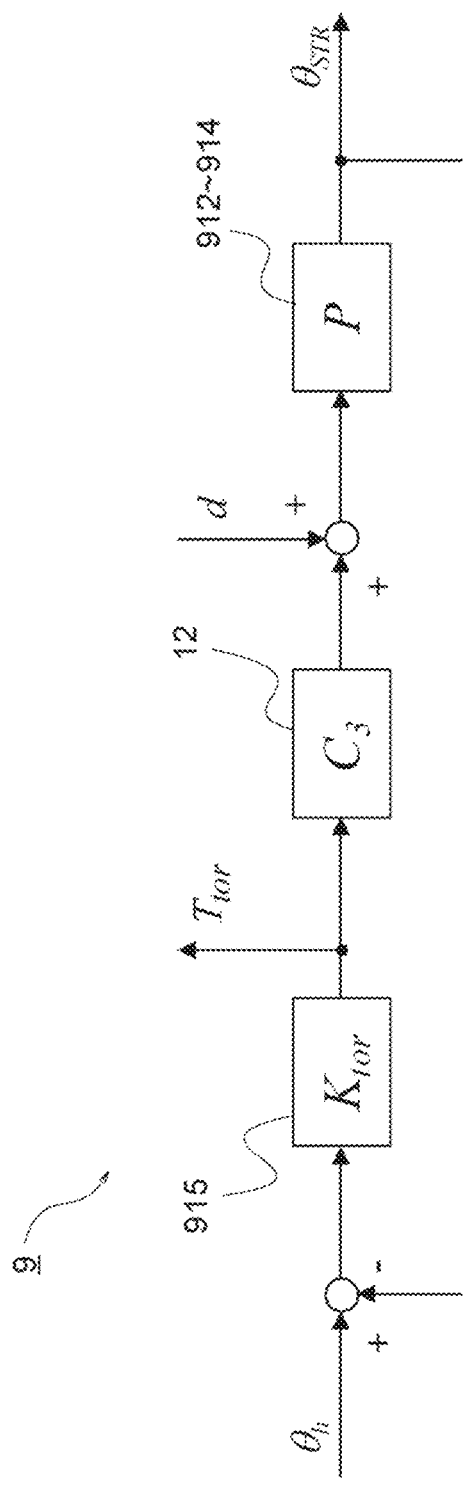
FIG. 3 is a block diagram illustrating a configuration of the electric power steering device in a case where a power assist is substantially zero.

FIG. 3 is a block diagram illustrating the configuration of the electric power steering device 9 when the power assist is substantially zero.

The influence of the disturbance d suppressed by the second control unit 12 is the largest in a range in which the power assist by the first control unit 11 becomes substantially zero. Since the torque cancellation unit 13 is provided, when the power assist is substantially zero, the electric power steering device is considered as a feedback system in which only the second control unit 12 is used as a controller as shown in FIG. 3. As a result, also a function of suppressing the disturbance d by the second control unit 12 becomes sharpening.

In the configuration shown in FIG. 3, a characteristic of transmission from the disturbance d applied to an input of the steering mechanism to the torsion bar torque (steering torque) is expressed by the following equation (1).

$$T_{tor}(s) = K_{tor}P(s)(1 + K_{tor}C_3(s)P(s))^{-1}d(s) \quad (1)$$

When gain $C_3(s)$ of the second control unit 12 is larger than a product $K_{tor}P(s)$ of the torsion coefficient of the torsion bar and the plant element in the steering mechanism, low sensitivity to the disturbance d is realized. Then, a frequency characteristic is applied to the gain $C_3(s)$ of the second control unit 12 by the filter, and a frequency range of the disturbance d to be suppressed is designated.

Figure 4:
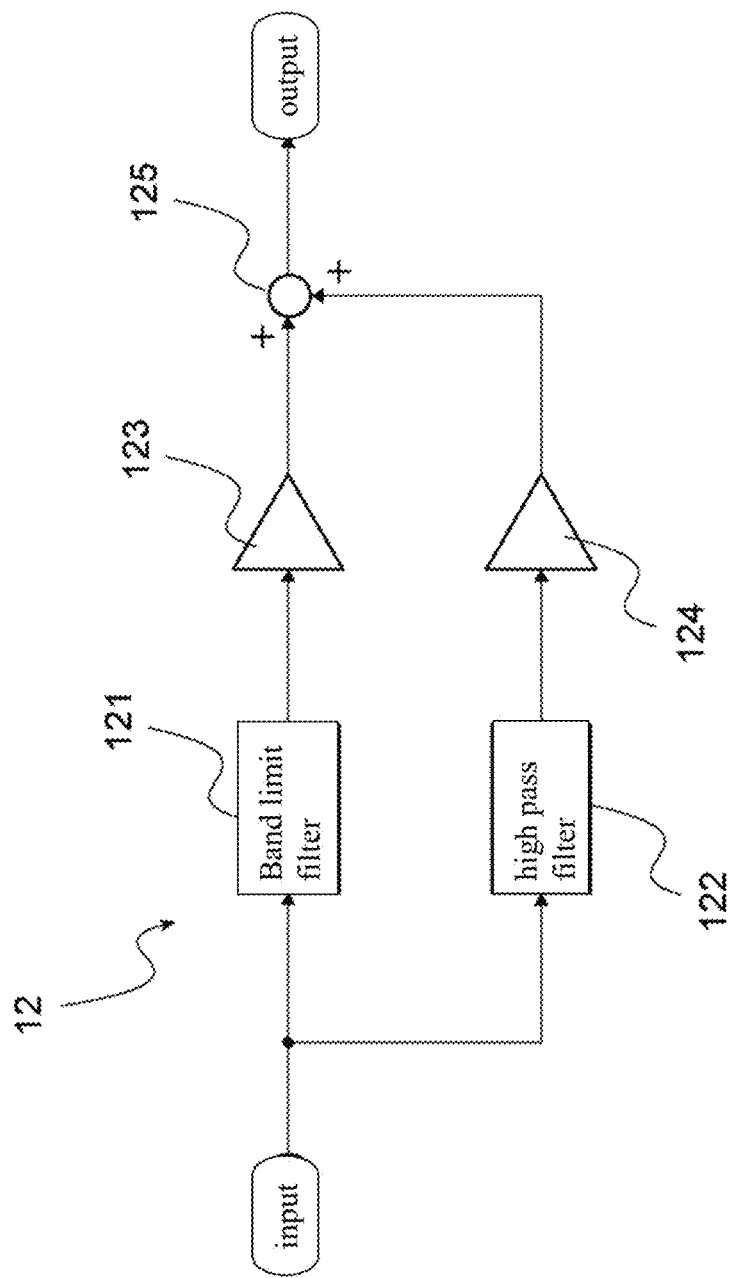
FIG. 4 is a diagram illustrating a filter structure in a second controller.

FIG. 4 is a diagram illustrating a filter structure in the second control unit 12.

The second control unit 12 includes, as an example, a band limit filter 121 and a high pass filter 122 that act in parallel on an input signal. In other words, the second control unit 12 uses, as the filter, a filter in which the band limit filter and the high pass filter are disposed in parallel.

The second control unit 12 also includes amplifiers 123, 124 that multiply the signals passed through the filters 121, 122 by the gain, respectively. Signals that have passed the filters 121, 122 and the amplifiers 123, 124, respectively, in parallel are added by an adder 125 to become an output signal.

In the second control unit 12, since the band limit filter 121 and the high pass filter 122 that are in parallel are used, a filter characteristic suitable for the disturbance suppression is obtained with a combination of the band limit filter 121 and the high pass filter 122.

As the filter characteristic of the band limit filter 121, for example, a characteristic of the following equation (2) is preferable.

$$F(s) = 1 - \frac{s^2 + 2\zeta_2 \omega_{SUS} + \omega_{SUS}^2}{s^2 + 2\zeta_1 \omega_{SUS} + \omega_{SUS}^2} \quad (2)$$

It should be noted that $\omega_{sus}$ is a natural frequency of a suspension in the steering mechanism.

Figure 5:
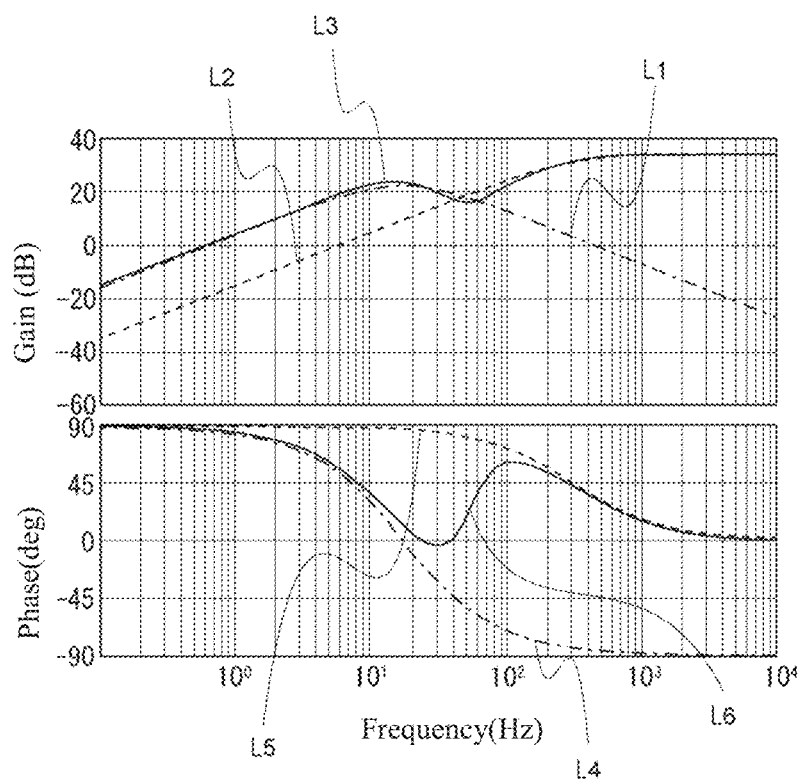
FIG. 5 shows graphs illustrating frequency characteristics obtained by the filter structure shown in FIG. 4.

FIG. 5 shows graphs illustrating frequency characteristics obtained by the filter structure shown in FIG. 4.

Simulation results of the transmission characteristic represented by the above equation (1) are shown in FIG. 5.

In an upper part of FIG. 5, the gain of the output with respect to the input is shown, and in a lower part, a value of difference between a phase of the input signal and a phase of the output signal is shown. A horizontal axis of each graph indicates a frequency of the input signal.

Alternate long and short dash lines L1, L4 shown in FIG. 5 represent the simulation results in which only contribution of the band limit filter 121 is considered. Broken lines L2, L5 shown in FIG. 5 represent the simulation results in which only contribution of the high pass filter 122 is considered. Solid lines L3, L6 shown in FIG. 5 represent the simulation results in which the contribution of both the band limit filter 121 and the high pass filter 122 is considered.

It turns out that by combining the frequency characteristic having a gentle peak by the band limit filter 121 and the frequency characteristic slanting upward from left to right by the high pass filter 122, the frequency characteristic in which the gain in the frequency region lower than 100 Hz is suppressed is obtained. Such frequency characteristic efficiently suppresses the disturbance d applied to the steering mechanism, and the power assist with less influence of the disturbance d is realized.

In the above description, although an example in which the motor 10 is built into the steering control device 1 is shown, the steering control device of the present disclosure may be a device having only a control side without a built-in motor.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A steering control device for controlling drive of a motor that drives a steering mechanism according to an operation amount of a steering wheel, the steering control device comprising:
   a first torque command controller that instructs the motor on motor torque according to the operation amount of the steering wheel; and
   a second torque command controller that instructs the motor on the motor torque according to the operation amount of the steering wheel in parallel with the first torque command controller; wherein
   the second torque command controller suppresses a frequency region corresponding to disturbance added to the steering mechanism with respect to the operation amount of the steering wheel with a filter;
   the steering wheel applies steering torque to the steering mechanism via a torsion bar;
   the steering control device further includes a cancellation command controller;
   the cancellation command controller cancels the steering torque from an output of the second torque command controller to work together with the second torque command controller to suppress the disturbance added to the steering mechanism with respect to the operation amount of the steering wheel; and
   the steering torque is applied in parallel with:
   (i) an output of the first torque command controller; and
   (ii) the output of the second torque command controller after the cancellation command controller has canceled the steering torque from the output of the second torque command controller.

2. The steering control device according to claim 1, wherein the filter includes a band limit filter and a high pass filter disposed in parallel.

3. The steering control device according to claim 1, wherein the second torque command controller decreases the motor torque instructed to the motor as a vehicle speed decreases.

4. The steering control device according to claim 1, wherein
   a gain of the second torque command controller is larger than a product of a torsion coefficient of the torsion bar and a plant element in the steering mechanism.

5. A power steering device, comprising:
   a steering control device to control driving of a motor that drives a steering mechanism according to an operation amount of a steering wheel, the steering control device including:
   a first torque command controller that instructs the motor on motor torque according to the operation amount of the steering wheel; and
   a second torque command controller that instructs the motor on the motor torque according to the operation amount of the steering wheel in parallel with the first torque command controller; wherein
   the second torque command controller suppresses a frequency region corresponding to disturbance added to the steering mechanism with respect to the operation amount of the steering wheel with a filter;
   the steering wheel applies steering torque to the steering mechanism via a torsion bar;
   the steering control device further includes a cancellation command controller;
   the cancellation command controller cancels the steering torque from an output of the second torque command controller to work together with the second torque command controller to work together with the second torque command controller to the disturbance added to the steering mechanism with respect to the operation amount of the steering wheel with the filter and the motor torque that cancels the steering torque;
   the steering torque is applied in parallel with:
   (i) an output of the first torque command controller; and
   (ii) the output of the second torque command controller after the cancellation command controller has canceled the steering torque from the output of the second torque command controller;
   the motor includes a drive that is controlled by the steering control device; and
   the steering mechanism is driven by the motor.

* * * * *